United States Patent Office 3,377,187
Patented Apr. 9, 1968

3,377,187
GLOSSY, TRANSPARENT NYLON FILM HAVING AN IONICALLY REACTED CONTENT OF A STRONGLY ACIDIC MATERIAL AND METHOD OF MAKING SAME
Malcolm Macfarland Donaldson, Bedford Village, N.Y., and David Randal Sexsmith, Boonton, N.J., assignors to American Cyanamid Company, Stamford, Conn., a corporation of Maine
No Drawing. Continuation-in-part of applications Ser. No. 213,149, July 30, 1962, and Ser. No. 287,210, June 12, 1963. This application Feb. 21, 1967, Ser. No. 617,481
10 Claims. (Cl. 117—47)

ABSTRACT OF THE DISCLOSURE

Glossy, transparent nylon film is contacted with a dilute solution of an acid having a pK less than 1 for a time only sufficient for an ionic reaction to take place between the acid and the film. The resulting film is not significantly harmed as to gloss and transparency and possesses an improved (and if desired, a greatly improved) affinity for hydrophobic organic topcoat material.

---

This is a continuation-in-part of our copending applications Ser. Nos. 213,149 filed on July 30, 1962 and 287,210 filed on June 12, 1963, and now both abandoned.

The present invention relates to glossy, transparent nylon film, at least one surface of which has a uniformly reacted content of a material improving the affinity of the film for hydrophobic organic topcoat material. The invention includes the modified film with and without the topcoat, and also includes the method of treating the film for the purposes described.

Nylon film is substantially composed of a hydrophobic, substantially water-insoluble, normally slightly basic, thermoplastic linear polyalkylenepolyamide and, as manufactured, is transparent, strong, flexible, elastic, odorless and nontoxic. Moreover, the film is substantially free from carboxylic and other acid groups and is also substantially free from groups generally considered basic as for example, amino groups, and is thus generally considered to be nonionic. For all of the foregoing reasons, the film is a desirable wrapping material, and is widely used as such.

Nylon film has two properties which render it disadvantageous for certain purposes. The first is that it is permeable to water vapor. As a result, it is not suitable for wrapping materials such as food which should be kept moist. The second is that the film, although thermoplastic, is not satisfactorily heat-sealable. When nylon film is sealed to itself by local application of heat, the fused loci possess less strength than is regarded as satisfactory by modern commercial standards.

It has been proposed to topcoat nylon film with film-forming materials which would overcome these shortcomings. The proposals were not fruitful, because of the aforementioned poor affinity of nylon film for topcoat material.

The discovery has now been made that the affinity of nylon film for topcoat material can be increased (and often very substantially increased) merely by wetting the film with a solution of a strongly acidic material and drying the film.

The treatment is brief and mild. The concentration of the strongly acidic material is sufficiently low, below 20% by weight, that no chemical degradation of the film occurs as for example by hydrolysis or degradation of the film, and the duration of the treatment is insufficiently long to deluster the film, to decrease its strength or tenacity, or to cause anything other than an ionic reaction to take place between the acid and the film. The film is thus substantially free from hydrolysis or other degradation products.

The reason why this treatment is successful is not known, and the invention does not depend on the demonstration of any theory. However, the invention results from our discovery that nylon film, although apparently non-ionic and neutral, possesses the character of a basic amine to a very small but detectable extent, and we believe that it is this basic amino character which is responsible for the poor affinity of the film for topcoat material. We believe furthermore that the basic character of the film is ascribable to the

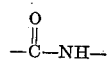

groups in the chain, and that the effect of the present invention is to neutralize the basic character of at least part of these groups or to neutralize their basic character entirely if desired.

The film product of the present invention is thus nylon film at least one surface of which has a reacted content of, and preferably is rendered substantially neutral by, a strongly acidic material.

The invention does not primarily depend upon the particular method used to neutralize the film or upon the neutralizing agent or agents used. From the point of view of process, the essential feature of the invention is wetting the film surface or surfaces with a solution of strongly acid material, followed by drying the film.

The strongly acidic materials are acids and salts which have a pK of less than 1. Suitable acids are trichloroacetic acid, benzenesulfonic acid, nitric acid, hydrochloric acid, sulfuric acid, phosphoric acid, polyvinylbenzenesulfonic acid, and p-toluenesulfonic acid.

Strongly acidic salts suitable for practice of the invention include the salts of strong monobasic acids with weak bases and the partial salts of strong polybasic acids with strong bases. Examples of salts of these types are ammonium nitrate, trimethylamine benzenesulfonate, and sodium acid sulfate.

The aforementioned acids and acidic materials are water-soluble and may be employed in aqueous solution which preferably contains an effective amount of a wetting agent to insure uniform wetting of the film with the solution.

We have found it entirely practical, however, to employ the strongly acid material in organic solution, and this has two principal advantages. First, it often provides more intimate contact between the film and the acidic material. Secondly, it decreases the problem of corrosion.

Suitable volatile solvents for this purpose include methanol, ethanol, propanol, and tetrahydrofuran.

In each instance, pK is the negative of the logarithm of the ionization constant of the acid employed. Thus the pK's of sulfuric acid, trichloroacetic acid and toluenesulfonic acid are respectively 0.40, 0.89, and 0.18.

The concentration of the strongly acidic material in the treating solution need not be high, and is less than 20% by weight. We have not found any additional improvement to result when the concentration of the strongly acidic material in the solution is in excess of 5% by weight, as compared with the results achieved by the use of more dilute solutions. On the other hand, we have observed a major improvement when the treating solution contains as little as 0.5% of the strong acidic material by weight, so that evidently there is no amount of acidic material, however small, which will not impart at least some benefit to the film.

In general, it appears preferable for the treating solution to contain between about 0.2% and 2% by weight of the strongly acidic material, because this proportion affords excellent results on almost instantaneous contact, and avoids the dangers of under and overuse of the strongly acidic material. The strongly acid material reacts very rapidly with the film even at room temperature and apparently the reaction goes to completion within a few seconds. The resulting film may be but need not be washed with water following the treatment.

The film may be contacted with the solution of the acidic material in any convenient way, on either or both sides. It thus may be treated by passage under spray, or through a roller coater. We prefer to pass the film through a bath of the solution, because this permits the entire surface of both sides of the film to be treated simultaneously and uniformly at minimum cost.

The invention will be more particularly described by reference to the examples which follow. These examples include specific embodiments of the invention and are not to be construed as limitations thereon.

Example 1

The following illustrates nylon film having a surface which possesses improved affinity for hydrophobic topcoat material as the result of a uniformly reacted content of strongly acidic material applied from organic solution.

The following general procedure is followed.

A treating solution is prepared by mixing a strongly acidic material and commercial grade isopropanol as solvent or diluent in a flat laboratory pan to form solutions having the strengths shown in the table below. Sheets of glossy, clear, undyed, transparent nylon (polycaprolactam, i.e., nylon 6) film of a caliper of about 1 mil are passed through the baths with residence times as shown in the table, after which the sheets are oven-dried at 100° C. for 2 minutes to remove the alcohol.

The sheets are then topcoated with the topcoat materials shown in the table below by passing the sheets through a solution of the topcoat material, followed by drying at 100° C. until the topcoats are converted to non-blocking but flexible state.

The affinity of the nylon film for the topcoat material is determined by the adhesive tape test. For this test, a strip of cellulose film tape 1″ wide and 6″ long carrying a pressure-sensitive adhesive on one side ("Scotch" tape) is used. Two inches of this tape are firmly pressed upon the topcoat and the tape is then stripped from the topcoat with a swift motion employing maximum force in an effort to strip as much of the topcoat as possible from the film.

By this test, topcoat material is generally completely stripped from film which has not been treated, but the test does not strip off topcoat from film which has been treated by preferred methods of the present invention. Satisfactory adhesion is deemed to exist when at least half of the topcoat remains bonded to the film after the tape has been stripped off.

With each topcoat a control test is made in the same manner except that the acid solution is replaced with plain isopropyl alcohol as shown in the table.

The topcoats used are as follows.

*Melamine-alkyd resin.*—A mixture of 2.5 mols of phthalic anhydride, 0.25 mol of dimerized linoleic acid (Empol 1024), 2.25 mols of ethylene glycol, and 3.3 mol of trimethylolethane is heated at 230° C. until a syrup is formed which has an acid number of less than 5. The syrup is diluted with toluene and cooled. To this is added ⅓ mol of hexakis(methoxymethyl) melamine as crosslinking agent. The amount of toluene added is predetermined to yield a syrup of coating viscosity.

*Melamine-glycol resin.*—One mol of hexakis(methoxymethyl) melamine is reacted at 145° C. with 3 mols of 2-methyl-2,4-pentanediol in the presence of p-toluenesulfonic acid as catalyst, to a point just short of gelation. The resin is then rapidly cooled by addition of sufficient cold toluene to form a solution of coating viscosity, and the solution is cooled to room temperature.

*Methyl methacrylate-ethyl acrylate-methacrylic acid tripolymer.*—25 mols of methyl methacrylate, 65 mols of ethyl acrylate and 10 mols of methacrylic acid are dissolved with 1% butyl peroxide and 1% butyl hydroperoxide as catalysts in a mixed solvent composed of a 1:1 by weight xylene-butanol mixture to give a solution containing 58% by weight of the three monomers. The solvent mixture is poured in a 3-necked flask equipped with reflux condenser, thermometer and stirrer and the monomer reaction mixture is added to the solvent slowly while the solvent is refluxing over a period of two hours. When addition is complete, refluxing is continued until the catalyst decomposes (about one hour), after which the solution is cooled. It is then ready for use.

*Methyl methacrylate-ethyl acrylate (20:80 molar ratio) copolymer.*—Made by method similar to above.

*Butyl methacrylate-isobutylene-methacrylic acid terpolymer (molar ratio 40:40:20).*—40 g. of methacrylic acid, 80 g. of butyl methacrylate, 200 g. of tetrahydrofuran, and 4 g. of benzoyl peroxide are charged into an autoclave pressurized to 100 lb./in.$^2$ with nitrogen. After one hour the pressure is vented and 80 g. of isobutylene is bled in. The autoclave is sealed and heated at 100°–130° C. for two hours; a pressure of 100–105 lb./in.$^2$

| Run No. | Acid Name | Percent [1] | Contact time | Topcoat Name | Adhesion [2] |
|---|---|---|---|---|---|
| 1 | None (Control) | | 5 sec | Melamine-alkyd resin | 0 |
| 2 | H$_2$SO$_4$ | 2.0 | 5 sec | do | 5 |
| 3 | H$_2$SO$_4$ | 0.5 | 5 sec | do | 5 |
| 4 | H$_2$SO$_4$ | 0.5 | 5 min | do | 5 |
| 5 | HCl | 2.0 | 5 sec | do | 5 |
| 6 | Cl$_3$CCOOH | 2.0 | 5 sec | do | 4 |
| 7 | CH$_3$C$_6$H$_4$SO$_3$H | 2.0 | 5 sec | do | 5 |
| 8 | CH$_3$C$_6$H$_4$SO$_3$H | 1.0 | 5 sec | do | 5 |
| 9 | CH$_3$C$_6$H$_4$SO$_3$H | 0.5 | 5 sec | do | 5 |
| 10 | None (Control) | | 5 sec | Melamine-glycol resin | 0 |
| 11 | CH$_3$C$_6$H$_4$SO$_3$H | 2.0 | 5 sec | do | 5 |
| 12 | CH$_3$C$_6$H$_4$SO$_3$H | 1.0 | 5 sec | do | 5 |
| 13 | CH$_3$C$_6$H$_4$SO$_3$H | 0.5 | 5 sec | do | 5 |
| 14 | None (Control) | | 5 sec | Methyl methacrylate-methacrylic acid terpolymer | 0 |
| 15 | CH$_3$C$_6$H$_4$SO$_3$H | 0.5 | 5 sec | do | 2½ |
| 16 | CH$_3$C$_6$H$_4$SO$_3$H | 2.0 | 5 sec | do | 5 |
| 17 | CH$_3$C$_6$H$_4$SO$_3$H | 2.0 | 5 sec | Methyl methacrylate-ethyl acrylate copolymer | 5 |
| 18 | CH$_3$C$_6$H$_4$SO$_3$H | 2.0 | 5 sec | Butyl methacrylate-isobutylene-methacrylic acid terpolymer | 5 |

[1] Based on the weight of the acid on the weight of the solution. The solvent is isopropanol at room temperature in each case.
[2] By tape test (see text above). 0=substantially all topcoat removed; 5=substantially no topcoat removed. Other numbers represent removal of intermediate amounts.

develops. The autoclave is cooled, and vented and the product is dried at 100° C. under vacuum.

In each instance the acid solution is prepared by adding sufficient of a concentrated aqueous solution of the particular acid to isopropanol to provide the concentration of acid shown above.

To the eye the gloss and transparency of the samples of film are not affected by the treatment.

Example 2

The procedure of run No. 7 of Example 1 is repeated except that tetrahydrofuran is employed as the solvent in place of the methanol. Results are substantially the same.

Example 3

The procedure of run No. 7 of Example 1 is repeated except that the solvent is butanol. Results are substantially the same.

Example 4

The following illustrates the treatment of nylon film with strongly acid material applied from aqueous solution.

To a 2% by weight solution of 100% $H_2SO_4$ in water is added sufficient of a wetting agent to decrease the surface tension of the solution so that it wets the film, after which the film is immersed in the solutions for about 1 second. The treatment does not harm the gloss or transparency of the film. The film is then dried and topcoated with the melamine-alkyd resin solution which has been described above, and is oven-cured as described above.

The adhesion between the topcoat and the nylon film is determined by the method of Example 1.

The procedure is repeated using a 1% by weight solution of sulfuric acid, and again using a different wetting agent. A control test is run by use of 2% aqueous sulfuric acid which contains no wetting agent. Results are as follows. To the eye, there is no change in the gloss or transparency.

| Run No. | $H_2SO_4$, Percent | Treating Solution Wetting Agent Name | Percent | Topcoat Adhesion [1] |
|---|---|---|---|---|
| 1 | 2 | None | (2) | (2) |
| 2 | 1 | Sodium dioctyl sulfosuccinate. | 0.0005 | 5 |
| 3 | 2 | ___do___ | 0.0005 | 5 |
| 4 | 1 | React. prod. of octylphenol with 5 mols of ethylene oxide. | 0.0005 | 5 |
| 5 | 2 | ___do___ | 0.0005 | 5 |

[1] For ratings see footnote 2 of Example 1.
[2] The solution did not wet the film.

Example 5

The following illustrates the process of the present invention wherein an acid salt is used as the treatment agent.

The procedure of run No. 4 of Example 4 is repeated except that the 1% sulfuric acid solution is replaced by a 1% solution of sodium acid sulfate. The adhesion of the topcoat after curing is rated "5" by the test of Example 1.

Example 6

The procedure of runs Nos. 11 and 16 of Example 1 is repeated except that the acid treating solution is hot (65°–70° C.), the contact time is 15 seconds in the repetition of run 11 and 30 seconds in the repetition of run 16, and the wet films (after treatment) are washed with distilled water for 1 minute at 20° C. before drying to remove the residual free acid.

The gloss, strength, and properties of the film are substantially the same.

Example 7

The procedure of Example 4 is repeated except the acid material is ammonium nitrate.

The topcoat film develops an adhesion value of 4 in the tape test without change in gloss or strength.

Example 8

Nylon film is immersed for 5 seconds in a 1.0% by weight solution of sulfuric acid in water containing 0.0005% by weight of Surfonic N–95 (an octylphenol-ethylene oxide condensate) as wetting agent, and is then dried. The treatment does not affect the gloss or strength of the film.

The film is topcoated with saran by immersion in a 10% by weight solution of saran (a thermoplastic water-insoluble non-ionic copolymer predominantly composed of vinylidene chloride linkages), after which the film is allowed to drain dry at room temperature and is finished by heating in an oven for three minutes at 100° C.

The adhesion of the topcoat to the film is 3 as determined by the method of Example 1. The adhesion of a control topcoat (applied to the same film which had only been washed with the wetting agent solution containing no acid) is 0.

Example 9

A strip of nylon film is immersed in the acid treatment solution of Example 8 heated to 65° C. for 30 seconds. This time is sufficiently long to cause reaction of the basic groups of the film with the acid to go to substantial completion, and exceeds the longest time of practical utility.

The gloss of the film is determined in a 20° gloss-meter before and after the treatment. The treatment causes the gloss of the film to increase by 6.5%.

Example 10

The following illustrates the comparative effect on gloss of the step of contacting nylon film at different temperatures and for different times with aqueous solutions of several acids having pK values less than 1.

Treating solutions are prepared having the concentrations of acids shown in the table below. In addition, the solutions contain 0.0005% by weight of wetting agent (an octylphenol ethylene oxide condensate, Surfonic N–95).

Strips of nylon 11 film are immersed in the test solutions for the times and at the tempratures shown below, rinsed in water, adherent water shaken off, and placed in an oven for 1 minute at 105% C. to remove any residual water. The change in gloss caused by this treatment is determined by use of a 60° laboratory glossmeter having a polished black glass as the standard. The samples are held against a pressure plate when measured to keep them flat. Results are as follows.

| Sample No. | Treating Bath | | | Duration,[1] sec. | Percent Change in Gloss [2] |
|---|---|---|---|---|---|
| | Acid Used | | Temp., °C. | | |
| | Formula | Conc., Percent | | | |
| 1 | $H_2SO_4$ | 1.0 | 20 | 5 | +0.97 |
| 2 | | | 65 | 5 | +2.35 |
| 3 | | | 65 | 30 | −0.42 |
| 4 | HCl | 1.0 | 20 | 30 | +2.35 |
| 5 | $H_3PO_4$ | 1.0 | 65 | 5 | +0.97 |
| 6 | | | | 30 | −0.42 |

[1] Of immersion of film in bath. Film is washed with water immediately on removal from bath.
[2] Average of 3 or 4 readings in each instance.

The results show that the treatment does not significantly harm the gloss, and that when the treating solution is hot (e.g., when it has a temperature of 65° C.), the gloss of the film can be slightly but definitely improved.

We claim:
1. Film consisting essentially of glossy, transparent hydrophobic water-insoluble nylon, at least one surface of which has an ionically reacted content of an acidic material having a pK less than 1, the gloss and transparency of said film being substantially that of glossy transparent film the surface of which has no ionically reacted content of acidic material having a pK less than 1; said film being substantially free from hydrolysis and degradation products.

2. Film according to claim 1 wherein the acidic material is sulfuric acid.

3. Film according to claim 1 wherein the amount of said acidic material is sufficient to neutralize the normally basic character of said film.

4. A process of treating glossy, transparent water-insoluble nylon film to improve its affinity for hydrophobic organic topcoat material, when consists essentially in contacting said film with a solution containing less than 20% by weight of an acidic material having a pK less than 1, for a time only sufficient for an ionic reaction to take place between said acidic material and said film, without substantially decreasing the gloss and transparency of said film and without forming hydrolysis and degradation products thereof.

5. A process according to claim 4 wherein the acidic material is sodium acid sulfate.

6. A process according to claim 4 wherein the weight of said acidic material is between 2% and 0.2% of the weight of said solution.

7. A process according to claim 4 wherein the solution of acidic material is hot.

8. A process of providing glossy transparent nylon film with an adherent hydrophobic organic topcoat without decreasing the gloss or transparency of said film, which consists essentially in first contacting at least one side of said film with a solution containing less than 20% by weight of acidic material having a pK less than 1 only until an ionic reaction takes place between said material and said film, without substantially decreasing the gloss and transparency of said film and without forming hydrolysis and degradation products thereof, and then coating said side with hydrophobic organic topcoat material.

9. A process according to claim 8 wherein the topcoat is a 2.5:0.25:2.25:3.3:0.33 molar ratio phthalic anhydride:dimerized linoleic acid:ethylene glycol:trimethylolethane:hexakismethoxymethylmelamine condensate.

10. A process according ot claim 8 wherein the topcoat material is Saran.

References Cited

UNITED STATES PATENTS

| | | | |
|---|---|---|---|
| 2,238,694 | 4/1941 | Graves | 161—173 |
| 2,251,508 | 8/1941 | Watson | 117—118 |
| 2,342,823 | 2/1944 | Schlack | 260—78 |
| 2,423,429 | 7/1947 | Pollard | 117—47 |
| 2,491,454 | 12/1949 | Nute | 117—138.8 |
| 2,683,100 | 7/1954 | Edgar | 117—161 |
| 2,779,687 | 1/1957 | Buchanan et al. | 117—47 |
| 3,057,752 | 10/1962 | Covington et al. | 117—138.8 |
| 3,060,550 | 10/1962 | Smith | 28—76 |
| 3,063,869 | 11/1962 | Roth | 117—161 |
| 3,235,426 | 2/1966 | Bruner | 117—47 |

WILLIAM D. MARTIN, *Primary Examiner.*

R. HUSACK, *Assistant Examiner.*

UNITED STATES PATENT OFFICE
CERTIFICATE OF CORRECTION

Patent No. 3,377,187                      April 9, 1968

Malcolm Macfarland Donaldson et al.

It is certified that error appears in the above identified patent and that said Letters Patent are hereby corrected as shown below:

Column 6, line 38, "Surfonic" should read -- sulfonic --; line 43, "105%C." should read -- 105° C. --. Column 8, line 11, "Saran" should read -- saran --.

Signed and sealed this 16th day of September 1969.

(SEAL)
Attest:

Edward M. Fletcher, Jr.
Attesting Officer

WILLIAM E. SCHUYLER, JR.
Commissioner of Patents